United States Patent [19]

Niehaus

[11] Patent Number: 5,848,817
[45] Date of Patent: Dec. 15, 1998

[54] VEHICLE SECURITY CAGE

[76] Inventor: John H. Niehaus, 209 W. Elgin, Spearfish, S. Dak. 57783

[21] Appl. No.: 917,886

[22] Filed: Aug. 27, 1997

[51] Int. Cl.[6] .................................................. B60R 27/00
[52] U.S. Cl. ........................................... 296/24.1; 280/749
[58] Field of Search ........................... 296/24.1; 280/748, 280/749

[56] References Cited

U.S. PATENT DOCUMENTS

| | | | |
|---|---|---|---|
| 1,611,248 | 12/1926 | Smith et al. | 296/24.1 |
| 2,219,412 | 10/1940 | Dean | 296/24.1 |
| 3,169,781 | 2/1965 | Abruzzino | 280/749 |
| 3,190,687 | 6/1965 | Johnson | 296/24.1 |
| 3,549,195 | 12/1970 | Kallinikos | 296/24.1 |
| 3,652,120 | 3/1972 | Bernbach | 296/24.1 |
| 4,159,141 | 6/1979 | Dirck | 296/24.1 |
| 4,227,735 | 10/1980 | Joyner | 296/24.1 |
| 4,509,788 | 4/1985 | Jan et al. | 296/24.1 |
| 4,546,728 | 10/1985 | May | 119/496 |
| 4,592,523 | 6/1986 | Herndon | 244/122 AG |
| 4,919,467 | 4/1990 | Guimelli | 296/24.1 |
| 4,924,814 | 5/1990 | Beaudet | 119/712 |
| 4,947,883 | 8/1990 | Mayo | 135/90 |
| 4,964,666 | 10/1990 | Dillon | 296/24.1 |
| 5,004,286 | 4/1991 | Taylor, III et al. | 296/24.1 |
| 5,054,837 | 10/1991 | Chapman | 296/24.1 |
| 5,058,941 | 10/1991 | Soloman et al. | 296/24.1 |
| 5,080,416 | 1/1992 | Dirck | 296/24.1 |
| 5,511,842 | 4/1996 | Dillon | 296/24.1 |
| 5,536,057 | 7/1996 | Stewart | 296/24.1 |
| 5,735,564 | 4/1998 | Coogan | 296/24.1 |

FOREIGN PATENT DOCUMENTS

| | | |
|---|---|---|
| 2045871 | 3/1972 | Germany . |
| 7604715 | 11/1977 | Netherlands . |

*Primary Examiner*—Joseph D. Pape
*Attorney, Agent, or Firm*—Richard C. Litman

[57] ABSTRACT

A vehicle security cage that forms a barrier between front and rear passenger areas of a vehicle, and provides access to a portion of the rear passenger area by occupants of the front passenger area. The cage is configured in an L-shape with a front panel partition placed directly behind the front seat, connected to a side panel partition placed on the rear seat. The front panel partition includes brackets with apertures for bolting the front panel partition to the vehicle interior. The front panel partition is configured to extend from the ceiling of the vehicle to a predetermined distance from the ceiling of the vehicle that provides ample leg room for occupants. The side panel partition includes rear brackets and floor brackets with apertures for bolting the side panel partition to the rear interior of the vehicle and the floor of the vehicle. The side panel partition is configured to extend from the ceiling of the vehicle to the rear seat of the vehicle. In addition, the rear brackets may include vertically extending partition material to completely partition the rear seat from the front panel partition to the rear interior of the vehicle.

4 Claims, 2 Drawing Sheets

VEHICLE SECURITY CAGE

BACKGROUND OF THE INVENTION

1. Field of the Invention

The present invention relates generally to a vehicle security cage for a vehicle to form a barrier between the front and rear passenger areas of the vehicle and, more specifically, to a vehicle security cage that provides access to a portion of the rear passenger area by occupants of the front passenger area.

2. Description of Related Art

Vehicle partitions are commonly employed to separate the front and rear seat compartments of vehicles such as police cars, taxi cabs, etc., to prevent access to the front seat by someone located in the rear seat. Typically, these partitions include a dividing wall located behind the front seats of the vehicle that forms a barrier between the front seat occupants and the rear seat occupants. The storage area available in the front seats has generally been adequate for storing additional equipment such as flashlights, first-aid kits, etc. However, modern police cars include additional equipment, such as radar equipment, video equipment, etc., that has created a need for additional space to store and access equipment.

Examples of conventional single barrier partitions include U.S. Pat. No. 3,169,781, issued on Feb. 16, 1965 to Samuel A. Abruzzino, U.S. Pat. No. 3,190,687, issued on Jun. 22, 1965 to Wallace M. L. Johnson, U.S. Pat. No. 4,919,467, issued on Apr. 24, 1990 to Mark A. Guimelli, U.S. Pat. No. 4,964,666, issued on Oct. 23, 1990 to John A. Dillon, U.S. Pat. No. 5,058,941, issued on Oct. 22, 1991 to Tony J. Soloman et al., U.S. Pat. No. 5,511,842, issued on Apr. 30, 1996 to John A. Dillon, U.S. Pat. No. 5,536,057, issued on Jul. 16, 1996 to John M. Stewart, German Patent document number 2,045,871, published on March 1972, and Netherlands Patent document number 7,604,715, published on November 1977.

Other vehicle partition configurations include an animal transportation container, as described in U.S. Pat. No. 4,546,728, issued on Oct. 15, 1985 to Gary A. May, an ejection seat restraint system for limbs and hands, as described in U.S. Pat. No. 4,592,523, issued on Jun. 3, 1986 to Gerald F. Herndon, a pet restrainer, as described in U.S. Pat. No. 4,924,814, issued on May 15, 1990 to Alain B. Beaudet, a sun shade arrangement for a vehicle, as described in U.S. Pat. No. 4,947,883, issued on Aug. 14, 1990 to Kay L. Mayo, a vehicle divider for dividing a common seat between passengers, as described in U.S. Pat. No. 5,054,837, issued on Oct. 8, 1991 to Dorothy L. Chapman, and a prisoner transport module, as described in U.S. Pat. No. 5,080,416, issued on Jan. 14, 1992 to Ronald L. Dirck.

None of the above inventions and patents, taken either singly or in combination, is seen to describe the instant invention as claimed.

SUMMARY OF THE INVENTION

The present invention is a vehicle security cage for use in combination with a vehicle having front and rear passenger areas with front and rear seats having surfaces therein, a floor, a ceiling, a side internal surface, and a rear internal surface. The vehicle security cage forms a barrier between front and rear passenger areas of a vehicle, and provides access to a portion of the rear passenger area by occupants of the front passenger area. In addition, the vehicle security cage protects and secures occupants contained therein from animals or other occupants present in the additional available space in the rear passenger area. The vehicle security cage is generally configured in an L-shaped arrangement with a front panel partition intended to be placed directly behind the front seat connected to a side panel partition intended to be placed on the rear seat. The front panel partition and side panel partition may be constructed of any of a variety of heavy duty material that provides visibility to opposing sides of the front and side panel partitions of the vehicle security cage, such as a heavy gauge metal screen, unbreakable glass, lexan, etc., or a combination of such materials.

The vehicle security cage provides a secure area for an occupant in a portion of the rear passenger area, preferably approximately one third of the rear passenger area. This enables the occupant or occupants of the front seats to operate and generally perform their duties without concern about interference from the occupant or occupants of the rear seat. Furthermore, the vehicle security cage provides additional space for occupants of the front passenger area to store and access equipment in preferably approximately two thirds of the rear passenger area. Alternatively, the additional space in the rear passenger area may be used to accommodate a security animal such as a dog.

The front panel partition is configured to extend from the ceiling of the vehicle to a predetermined distance from the ceiling of the vehicle that provides ample leg room for an occupant or occupants. The front panel partition includes bracketing means with apertures for bolting or otherwise fastening the front panel partition to a side internal surface of the vehicle. The side panel partition includes rear bracketing means and floor bracketing means with apertures for bolting or otherwise fastening the side panel partition to a rear internal surface of the vehicle and the floor of the vehicle. The side panel partition is configured to extend from the ceiling of the vehicle to the rear seat of the vehicle.

Accordingly, it is a principal object of the invention to provide a vehicle security cage that effectively isolates occupants seated in the vehicle security cage from occupants seated in the front passenger area while providing access to a portion of the rear passenger area by occupants of the front passenger area.

It is another object of the invention to provide a vehicle security cage that is easy to install and remove from a vehicle.

It is a further object of the invention to provide a vehicle security cage that causes minimal damage to the interior of a vehicle.

It is an object of the invention to provide improved elements and arrangements thereof in a vehicle security cage for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
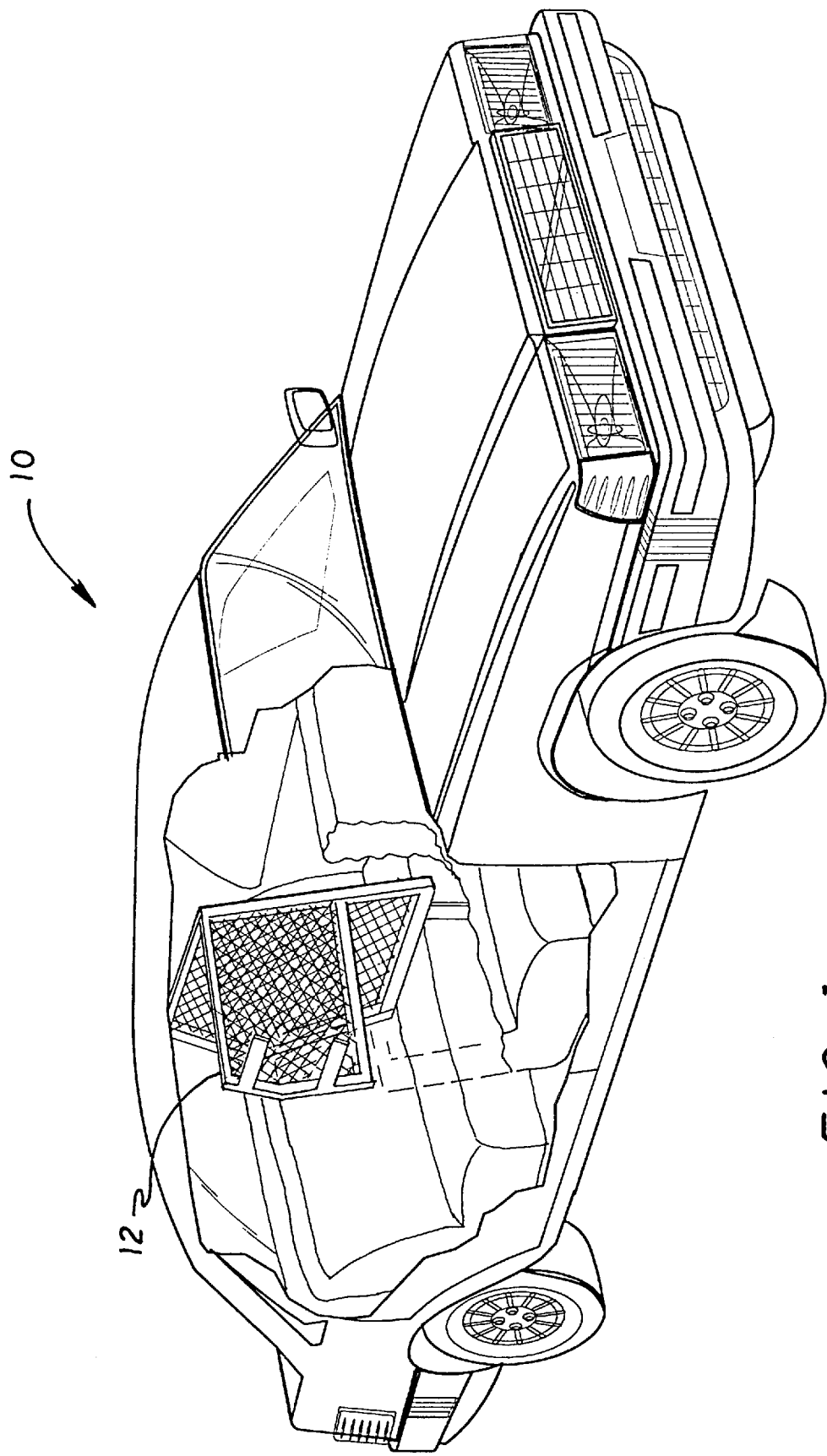
FIG. 1 is a perspective view of an automobile equipped with an embodiment of the inventive vehicle security cage having a portion of the automobile broken away so as to show the structure more clearly.

As shown in FIG. 1, an automotive vehicle generally designated 10 includes an embodiment of a vehicle security cage according to the invention generally designated 12 for use in combination with a vehicle having front and rear passenger areas with front and rear seats having surfaces therein, a floor, a ceiling, a side internal surface, and a rear internal surface. The vehicle may be a police patrol car or any typical passenger vehicle. Alternatively, the vehicle may be van, a jeep, or other type of vehicle. The vehicle security cage 12 forms a security barrier between the front and rear passenger areas of the vehicle, and provides access to a portion of the rear passenger area by occupants of the front passenger area. In addition, the vehicle security cage protects and secures occupants contained therein from animals or other occupants present in the additional available space in the rear passenger area.

Figure 2:
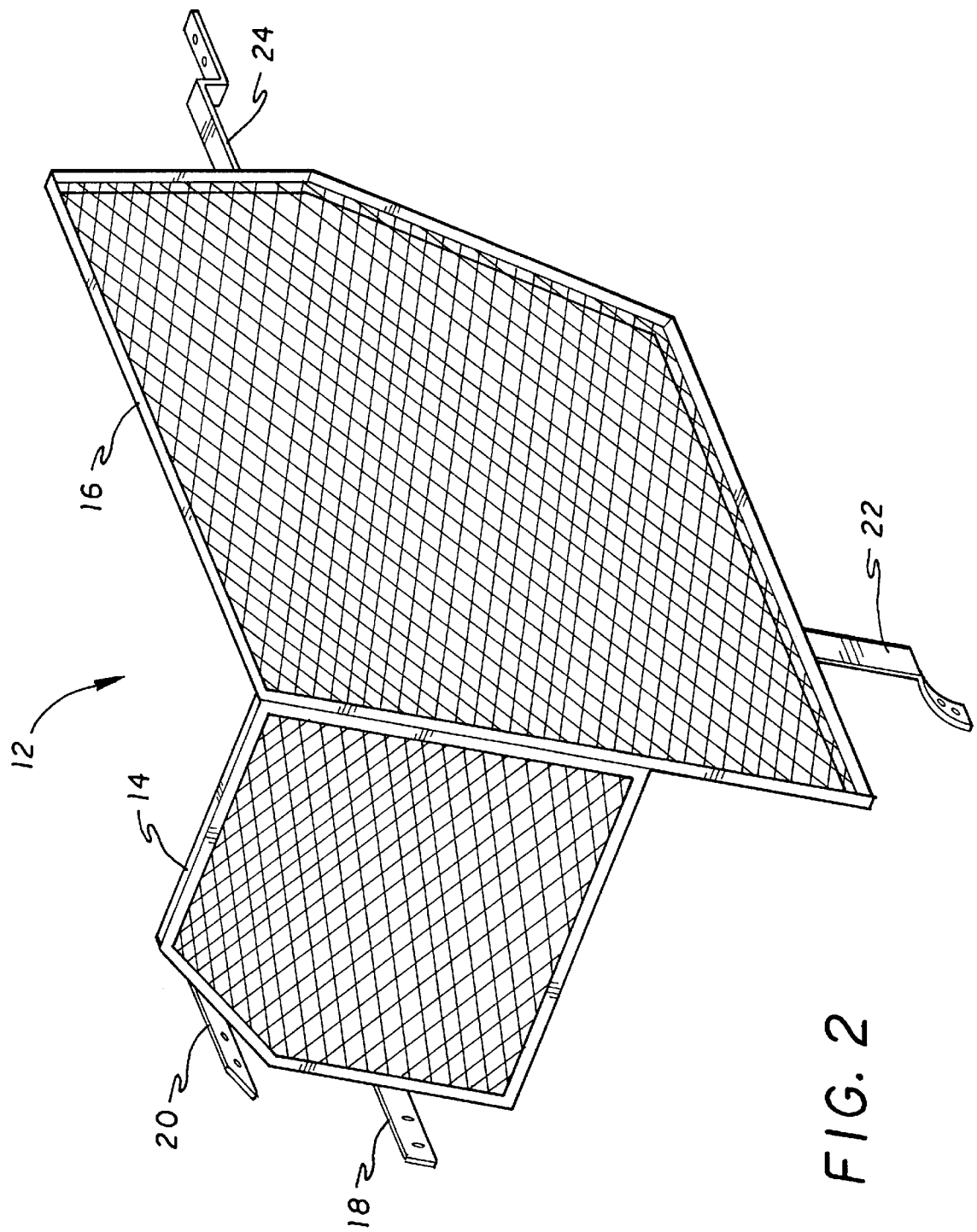
FIG. 2 is a perspective of an embodiment of the inventive vehicle security cage.

As shown in FIG. 2, the vehicle security cage 12 is generally configured in an L-shaped arrangement with a front panel partition 14 intended to be placed directly behind the front seat securely connected at approximately a ninety degree angle to a side panel partition 16 intended to be placed on the rear seat. The front panel partition and side panel partition may be constructed of any of a variety of heavy duty material that provides visibility to opposing sides of the front and side panel partitions of the vehicle security cage, such as a heavy gauge metal screen, unbreakable glass, lexan, etc., or a combination of such materials. Conventionally known fastening means such as bolts, screws, etc. (not shown), may be employed to secure the front panel partition to the side panel partition.

The vehicle security cage 12 provides a secure area for one or more occupants in a portion of the rear passenger area, preferably approximately one third of the rear passenger area. This enables the occupant or occupants of the front seats to operate and generally perform their duties without concern about interference from the occupant or occupants of the rear seat. In addition, the vehicle security cage provides additional space for occupants of the front passenger area to store and access equipment in preferably approximately two thirds of the rear passenger area. Alternatively, the additional space in the rear passenger area may be used to accommodate a security animal such as a dog. The particular distribution of the rear passenger areas may vary according to the needs or desires of the user.

The front panel partition 14 includes side bracketing means 18 and 20 with apertures for bolting or otherwise fastening the front panel partition 14 to a side internal surface of the vehicle interior. The front panel partition 14 is configured to extend from the ceiling of the vehicle to a predetermined distances from the ceiling of the vehicle to provide sufficient leg room for an occupant or occupants.

The side panel partition 16 includes rear bracketing means 24 and floor bracketing means 22 with apertures for bolting or otherwise fastening the side panel partition to a rear surface of the interior of the vehicle and the floor of the vehicle. The side panel partition 16 is configured to extend from the ceiling of the vehicle to the surface of the rear seat of the vehicle. The side panel partition 16 will normally have a greater vertical height than the front panel partition 14. However, these dimensions may vary according to the needs or desires of the user.

It is to be understood that the present invention is not limited to the embodiments described above, but encompasses any and all embodiments within the scope of the following claims.

I claim:

1. A vehicle security cage in combination with a vehicle having front and rear passenger areas with front and rear seats having surfaces therein, a floor, a ceiling, a side internal surface, and a rear internal surface, said vehicle security cage comprising:

a front panel partition positioned in the rear passenger area between the front and rear seats, said front panel partition extending from the ceiling of the vehicle to a predetermined distance below the ceiling of the vehicle;

a side panel partition positioned in the rear passenger area and securably attached at approximately a ninety degree angle to said front panel partition, said side panel partition extending from the ceiling of the vehicle to the seat surface of the rear seat of the vehicle;

side bracketing means attached to said front panel partition for securing said front panel partition to the side internal surface of the vehicle;

rear bracketing means attached to said side panel partition for securing said side panel partition to the rear internal surface of the vehicle; and floor bracketing means attached to said side panel partition for securing said side panel partition to the floor of the vehicle.

2. The combination according to claim 1, wherein said front panel partition and said side panel partition are made from heavy duty material that provides visibility from opposing sides of the panel partitions.

3. The combination according to claim 1, wherein said heavy duty material comprises a heavy gauge metal screen.

4. The combination according to claim 1, wherein said heavy duty material comprises unbreakable glass.

\* \* \* \* \*